US012168346B2

(12) United States Patent
Tatematsu et al.

(10) Patent No.: US 12,168,346 B2
(45) Date of Patent: Dec. 17, 2024

(54) FEED TRAY AND IMAGE FORMING APPARATUS INCLUDING THE SAME

(71) Applicant: BROTHER KOGYO KABUSHIKI KAISHA, Nagoya (JP)

(72) Inventors: Yuya Tatematsu, Nagoya (JP); Satoshi Miyase, Nagoya (JP); Hideaki Yoshimune, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 117 days.

(21) Appl. No.: 17/823,253

(22) Filed: Aug. 30, 2022

(65) Prior Publication Data

US 2023/0065393 A1 Mar. 2, 2023

(30) Foreign Application Priority Data

Aug. 31, 2021 (JP) ................................ 2021-140670

(51) Int. Cl.
*B65H 16/08* (2006.01)
*B41J 15/04* (2006.01)

(52) U.S. Cl.
CPC .............. *B41J 15/04* (2013.01); *B65H 16/08* (2013.01); *B65H 2404/633* (2013.01)

(58) Field of Classification Search
CPC ......... B41J 15/04; B41J 15/048; B65H 16/08; B65H 2404/63; B65H 2404/633
See application file for complete search history.

(56) References Cited

U.S. PATENT DOCUMENTS

| | | | | |
|---|---|---|---|---|
| 5,947,408 | A * | 9/1999 | Miyake | B65H 19/105 242/562 |
| 6,595,455 | B2 * | 7/2003 | Romes | B65H 23/08 52/749.12 |
| 6,883,408 | B2 * | 4/2005 | Shinga | B41J 11/663 399/385 |
| 11,427,424 | B2 * | 8/2022 | Wang | B65H 23/044 |
| 11,738,577 | B2 * | 8/2023 | Yamaguchi | B41J 15/044 347/110 |
| 2021/0300706 | A1 * | 9/2021 | Tsujimura | B65H 35/006 |

FOREIGN PATENT DOCUMENTS

JP 2003012167 A 1/2003

* cited by examiner

*Primary Examiner* — Leslie A Nicholson, III
(74) *Attorney, Agent, or Firm* — Scully, Scott, Murphy & Presser, P.C.

(57) ABSTRACT

A feed tray configured to accommodate a roll, in which a sheet-shaped medium is rolled in a roll shape, the feed tray includes: a support portion configured to contact an outer peripheral surface of a lower portion of the roll at two support positions with a lower end of the roll being interposed therebetween and to rotatably support the roll; and a path having an inlet disposed between the two support positions and configured to guide the sheet-shaped medium unrolled from the roll. The two support positions are shifted from each other in an upper-lower direction.

25 Claims, 7 Drawing Sheets

FEED TRAY AND IMAGE FORMING APPARATUS INCLUDING THE SAME

REFERENCE TO RELATED APPLICATIONS

This application claims priority from Japanese Patent Application No. 2021-140670 filed on Aug. 31, 2021. The entire content of the priority application is incorporated herein by reference.

BACKGROUND ART

A related art discloses a sheet feeding cassette (a feed tray) that is attachable to and removable from an installation opening of an image forming apparatus main body and accommodates a roll sheet (a roll body) in a state in which the roll sheet is pivotally supported.

In a configuration in which the roll sheet is supported in the sheet feeding cassette in the above-described related art, the work of replacing the roll sheet may be complicated. For example, when a new roll sheet shaft is attached to the sheet feeding cassette, there may be an operation of adjusting a position of the roll sheet such that the roll sheet shaft is appropriately supported by a bearing of the sheet feeding cassette.

Therefore, in order to facilitate the replacement work of the roll body (for example, the roll sheet), the present inventors have studied a configuration of a feed tray having a support portion that supports the roll body in a manner of coming into contact with an outer peripheral surface of a lower portion of the roll body. In such a configuration, the roll body is rotatably supported at two support positions that are at the same height level across a lower end of the roll body in a direction intersecting a rotation shaft of the roll body, and a sheet-shaped medium unrolled from the roll body is guided into a path. For example, as shown in FIG. 7, in a case where an inlet of the path is located between the two support positions, when a separation distance between the two support positions in a horizontal direction is small, after a leading end of the sheet-shaped medium passes through one support position and before the sheet-shaped medium is unrolled from the roll body (that is, before the leading end of the sheet-shaped medium is separated from the roll body), the sheet-shaped medium may reach the other support position and may not be guided to the path. In a case where the separation distance between the two support positions in the horizontal direction is increased and a distance required for the leading end of the sheet-shaped medium to reach the other support position after the leading end of the sheet-shaped medium passes through the one support position is increased, it may be easy to unroll the leading end of the sheet-shaped medium from the roll body before the leading end of the sheet-shaped medium reaches the other support position and the leading end of the sheet-shaped medium can be guided to the path. However, as the distance between the two support positions in the horizontal direction increases, a length of the path in the horizontal direction may be increased. As a result, a size of the feed tray in the horizontal direction may increase.

DESCRIPTION

Illustrative aspects of the present disclosure provide a feed tray and an image forming apparatus include the feed tray that can prevent an increase in a size of the feed tray in a horizontal direction while facilitating unrolling of a sheet-shaped medium from a roll body.

One illustrative aspect of the present disclosure provides a feed tray configured to accommodate a roll, in which a sheet-shaped medium is rolled in a roll shape, the feed tray including: a support portion configured to contact an outer peripheral surface of a lower portion of the roll at two support positions with a lower end of the roll being interposed therebetween and to rotatably support the roll; and a path having an inlet disposed between the two support positions and configured to guide the sheet-shaped medium unrolled from the roll, wherein the two support positions are shifted from each other in an upper-lower direction.

Another illustrative aspect of the present disclosure provides a feed tray configured to accommodate a roll, in which a sheet-shaped medium is rolled into a roll shape, the feed tray including: a support portion configured to rotatably support the roll; and a contact member configured to contact at least a part of an outer peripheral surface of a lower portion of the roll and to restrict a movement of the roll in a rotation direction.

Still another illustrative aspect of the present disclosure provides an image forming apparatus including: the feed tray according to the above-described illustrative aspects; a conveyance mechanism configured to convey the sheet-shaped medium of the roll accommodated in the feed tray; an image forming device configured to form an image on the sheet-shaped medium conveyed by the conveyance mechanism; and a housing configured to accommodate the conveyance mechanism and the image forming device, the feed tray being attachable to and removable from the housing.

According to the feed tray of the present disclosure, the two support positions of the support portion that supports the roll body are shifted in the upper-lower direction. Accordingly, it is possible to increase a distance along the circumferential direction of the roll body from one support position, passing through the lower end of the roll body, and up to the other support position while preventing an increase in a separation distance between the two support positions in the horizontal direction. Therefore, it is possible to prevent an increase in the size of the feed tray in the horizontal direction while facilitating unrolling of the sheet-shaped medium from the roll body between a position where the sheet-shaped medium passes through the one support position and a position where the sheet-shaped medium reaches the other support position.

According to the feed tray of another aspect of the present disclosure, the sheet-shaped medium can be easily unrolled from the roll body by bringing the contact member into contact with the outer peripheral surface of the roll body.

According to the image forming apparatus of the present disclosure, the sheet-shaped medium can be easily unrolled from the roll body.

Hereinafter, a printer 100 employing a feed tray 1 according to an illustrative embodiment of the present disclosure will be described with reference to the drawings.

Figure 1:
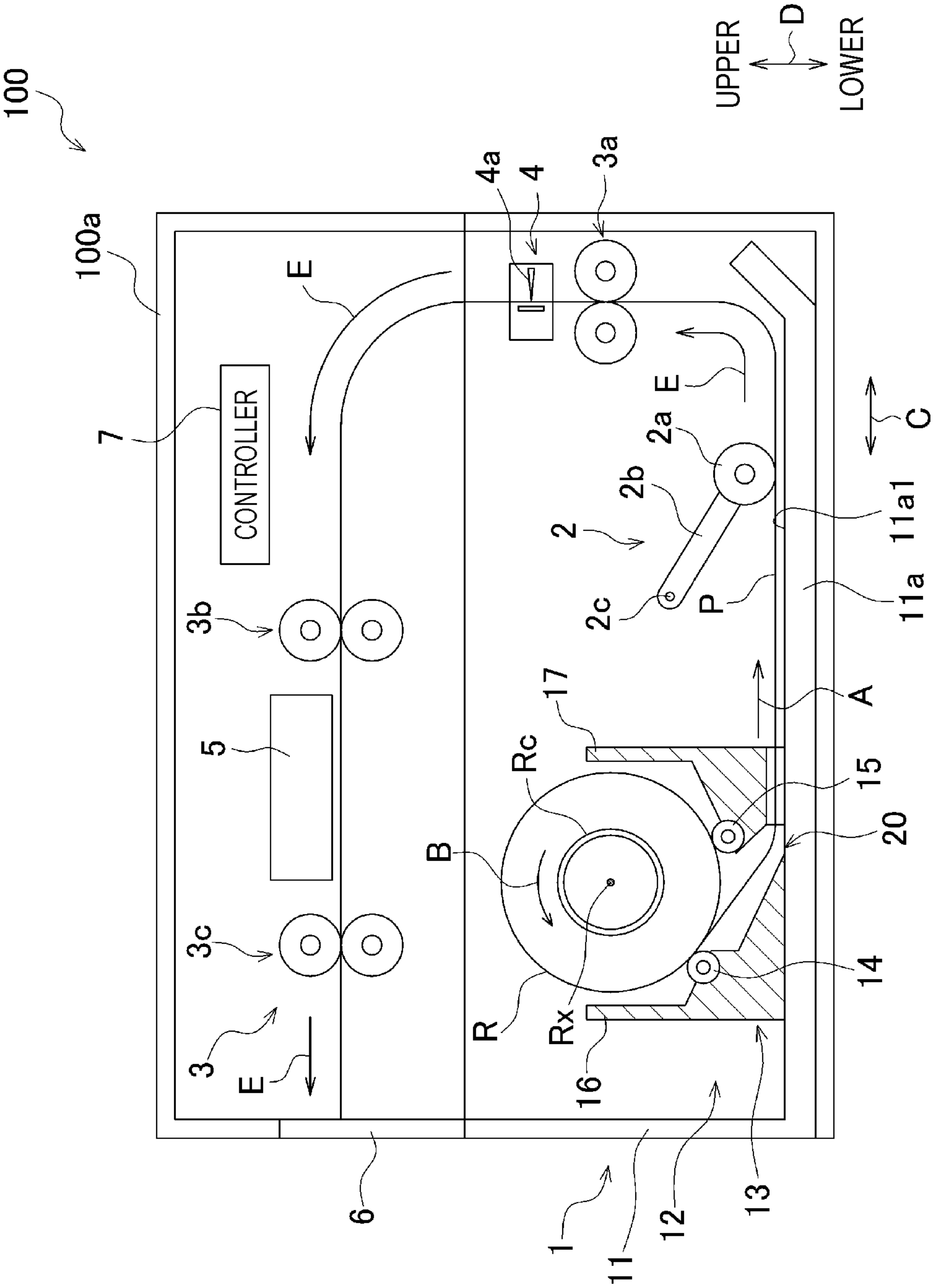
FIG. 1 is a schematic configuration diagram showing a printer employing a feed tray according to an illustrative embodiment of the present disclosure.

As shown in FIG. 1, the printer 100 (an "image forming apparatus" of the present disclosure) includes a housing 100*a*, the feed tray 1, a feed device 2, a conveyance device 3, a cutting device 4, a head 5, a discharge tray 6, and a controller 7. The feed tray 1 is attachable to and removable from a lower portion of the housing 100*a*. The discharge tray 6 configures one side wall of an upper portion of the housing 100*a*. The discharge tray 6 is openable or closable relative to the housing 100*a*.

As shown in FIG. 1, the feed tray 1 can accommodate a roll body R on which a long sheet P (a "sheet-shaped medium" of the present disclosure) is rolled into a roll shape around an outer peripheral surface of a cylindrical core member (a sheet core) Rc. The roll body R is disposed such that an axial direction (a direction perpendicular to the sheet surface in FIG. 1) along a rotation shaft Rx (a central shaft of the core member Rc) of the roll body R is orthogonal to an upper-lower direction D. The axial direction of the rotation shaft Rx also corresponds to a width direction of the sheet P. In the present illustrative embodiment, an advancing direction A in which the sheet P unrolled from the roll body R is guided to the path 20 to be described later and advances is substantially a right direction as shown in FIG. 1. When the roll body R rotates in a rotation direction B, the sheet P is unrolled from the roll body R. That is, the rotation direction B is also a direction in which the roll body R is unrolled.

As shown in FIG. 1, the feed tray 1 includes a tray main body 11, a support portion 12 that rotatably supports the roll body R and supports an outer peripheral surface of a lower portion of the roll body R, and a path 20 for guiding the sheet P unrolled from the roll body R. The tray main body 11 has a box shape opened upward and is configured to accommodate the roll body R. The support portion 12 includes a support base 13 and two rollers 14 and 15.

Figure 2:
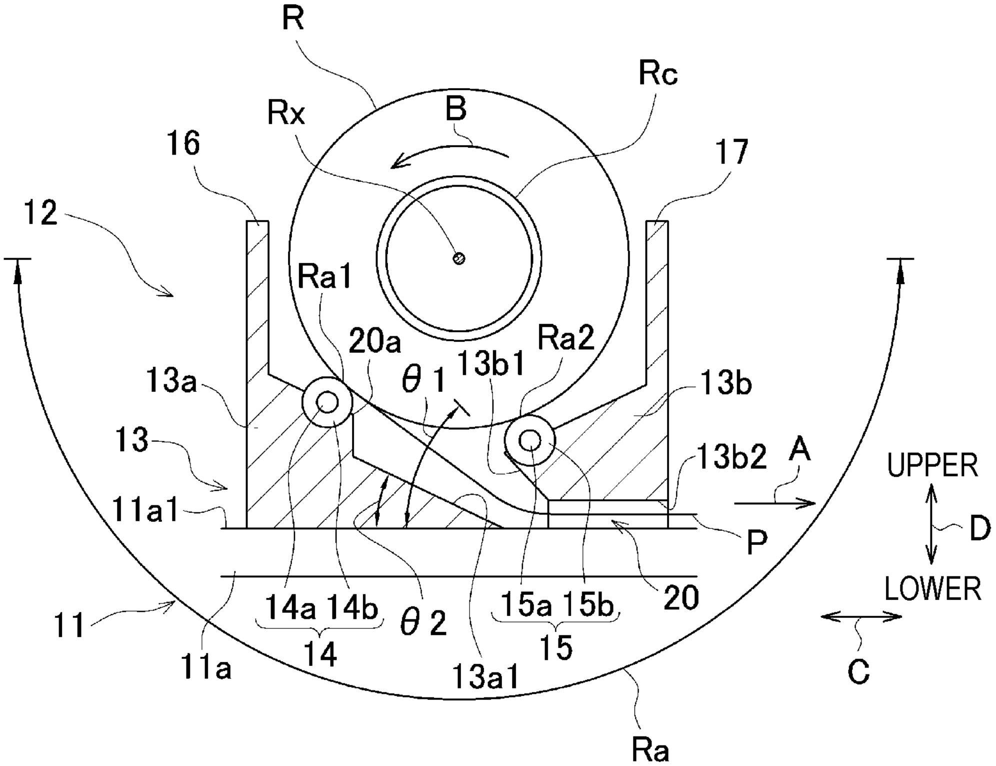
FIG. 2 is a cross sectional view showing main parts of the feed tray as viewed from an axial direction along a rotation shaft of a roll body.

As shown in FIG. 2, the support base 13 includes two base portions 13*a* and 13*b* that are arranged in a manner of being separated from each other in a horizontal direction C orthogonal to the rotation shaft Rx. These two base portions 13*a* and 13*b* are disposed on a bottom portion 11*a* of the tray main body 11. Each of the base portions 13*a* and 13*b* extends in an elongated manner along the axial direction of the rotation shaft Rx. The base portions 13*a* and 13*b* in the present illustrative embodiment are formed to be slightly longer than the sheet P, that is, a width of the roll body R. Most of the base portion 13*a* is disposed upstream (at a left side in FIG. 2) of the rotation shaft Rx of the roll body R supported by the support portion 12 in the advancing direction A. The base portion 13*a* has an inclined surface 13*a*1 (a "second guide surface" of the present disclosure) facing a lower surface of the sheet P unrolled from the roll body R. The inclined surface 13*a*1 is inclined downward toward the advancing direction A. The inclined surface 13*a*1 defines a part of the path 20.

As shown in FIG. 2, the base portion 13*b* is disposed downstream (at a right side in FIG. 2) of the rotation shaft Rx of the roll body R supported by the support portion 12 in the advancing direction A. The base portion 13*b* has an inclined surface 13*b*1 (a "first guide surface" of the present disclosure) facing an upper surface of the sheet P unrolled from the roll body R. The inclined surface 13*b*1 is inclined downward toward the advancing direction A. The inclined surface 13*b*1 defines a part of the path 20. A groove 13*b*2 that defines a part of the path 20 is formed in a lower surface of the base portion 13*b*. The groove 13*b*2 is opened toward a bottom surface 11*a*1, extends horizontally along the advancing direction A, and is formed such that a width of the groove 13*b*2 in the axial direction of the rotation shaft Rx is slightly longer than the width of the roll body R. The groove 13*b*2 is formed in a lower surface of the base portion 13*b* from a downstream end of the inclined surface 13*b*1 over the entire lower surface of the base portion 13*b* in the advancing direction A.

The path 20 is defined by the two inclined surfaces 13*a*1 and 13*b*1, the bottom surface 11*a* of the tray main body 11, and the groove 13*b*2. The path 20 has an inlet 20*a* (an inlet formed between upper ends of the two inclined surfaces 13*a*1 and 13*b*1) located between the two rollers 14 and 15, and is formed to extend from the inlet 20*a* to the right in the drawing (in the advancing direction A). Since the path 20 is formed in this manner, the sheet P unrolled from the roll body R can be guided to pass through the path 20 from between the two rollers 14 and 15 (between two support positions Ra1 and Ra2 to be described later) through the inlet 20*a*. As shown in FIG. 1, the sheet P that passed through the path 20 advances along the bottom surface 11*a*1 of the tray main body 11, and is guided to a feeding position where the sheet P is fed by a feed roller 2*a* (a position where the sheet P can come into contact with the feed roller 2*a*).

The inclined surface 13*b*1 is formed such that an inclination angle θ1 of the inclined surface 13*b*1 relative to the horizontal bottom surface 11*a*1 (a "horizontal plane" of the present disclosure) of the tray main body 11 is larger than an inclination angle θ2 of the inclined surface 13*a*1 relative to the bottom surface 11*a*1. As a result, the path 20 has a tapered shape from the inlet 20*a* along the advancing direction A. Therefore, it is possible to more smoothly guide the sheet P unrolled from the roll body R in the advancing direction A. The inclination angle θ1 is set to an inclination angle at which a jam is less likely to occur even when a leading end of the sheet P unrolled from the roll body R comes into contact with the inclined surface 13*b*1.

As shown in FIG. 2, a restriction portion 16 extending upward is formed at an upstream end portion of the base portion 13*a* in the advancing direction A. A restriction portion 17 extending upward is formed at a downstream end portion of the base portion 13*b* in the advancing direction A. These two restriction portions 16 and 17 are disposed in a manner of coming close to an outer peripheral surface of the roll body R of a maximum size that can be supported by the support portion 12. As a result, even when rolling of the roll body R is loosened and an outer diameter of the roll body R tends to increase, the outer peripheral surface of the roll body R comes into contact with the restriction portions 16 and 17, and it is possible to restrict an increase in the outer diameter. Inner surfaces of the restriction portions 16 and 17 facing the roll body R may be curved along the outer peripheral surface of the roll body R.

The two rollers ("support rollers" of the present disclosure) 14 and 15 extend long along the axial direction of the rotation shaft Rx, and are formed to be slightly longer than a width of the roll body R. The rollers 14 and 15 respectively include shaft members 14*a* and 15*a*, and cylindrical members 14*b* and 15*b* into which the shaft members 14*a* and 15*a* are inserted. The rollers 14 and 15 may each include a plurality of cylindrical members through which the shaft members 14*a* and 15*a* are inserted and which are arranged to be separated from one another along the axial direction of the rotation shaft Rx. In addition, a plurality of the rollers 14 and 15 may be disposed in a manner of being separated from one another along the axial direction of the rotation shaft Rx.

The roller 14 is disposed at the center of an upper portion of the base portion 13*a* in the horizontal direction C, and the shaft member 14*a* of the roller 14 is supported by the base portion 13*a* so as to be rotatable about a rotation shaft parallel to the rotation shaft Rx. The roller 14 is disposed upstream of and above the inclined surface 13*a*1 in the advancing direction A. The roller 15 is disposed at an upper portion of an upstream end portion of the base portion 13*b* in the advancing direction A, and the shaft member 15*a* of the roller 15 is supported by the base portion 13*b* so as to be rotatable about a rotation shaft parallel to the rotation shaft Rx. The roller 15 is disposed downstream of the roller 14 in the advancing direction A. The roller 15 is disposed below the roller 14 and above the inclined surface 13*b*1 in the upper-lower direction D. As shown in FIG. 2, the two rollers 14 and 15 support the roll body R from below in a state in which the rollers 14 and 15 come into contact with an outer peripheral surface of a lower portion of the roll body R, that is, a lower semicircular region Ra of the outer peripheral surface of the roll body R in the present illustrative embodiment. The two rollers 14 and 15 are configured to support the roll body R in a state in which the two rollers 14 and 15 come into contact with the outer peripheral surface (the lower semicircular region Ra) of the roll body R at two support positions Ra1 and Ra2 with a lower end of the roll body R being interposed therebetween in the horizontal direction C. In other words, the two support positions Ra1 and Ra2 are opposite to each other across the lower end of the roll body R in the horizontal direction C. The support position Ra1 is located upstream of the lower end of the roll body R in the advancing direction A. The support position Ra2 is located downstream of the lower end of the roll body R in the advancing direction A. The support position Ra1 is disposed above the support position Ra2 in the upper-lower direction D. A separation distance between the two rollers 14 and 15 is smaller than an outer diameter of the core member Rc. Therefore, the roll body R does not fall between the two rollers 14 and 15.

Figure 3:
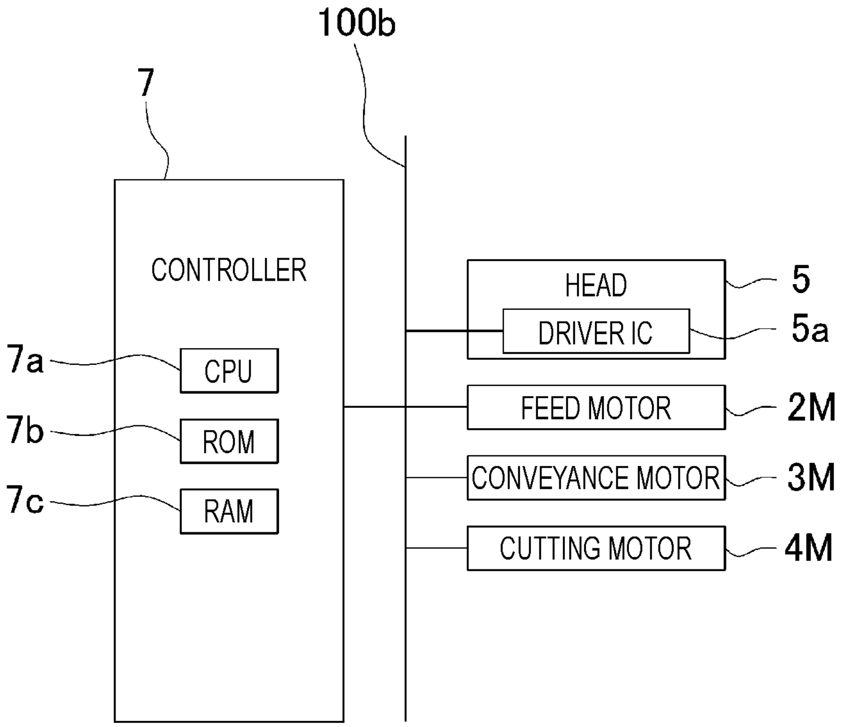
FIG. 3 is a block diagram showing a controller.

As shown in FIG. 1, the feed device 2 includes the feed roller 2*a*, an arm 2*b*, a transmission mechanism (not shown), and a feed motor 2M (see FIG. 3). The feed roller 2*a* is pivotally supported by a tip end of the arm 2*b*. The arm 2*b* is rotatably supported by a support shaft 2*c*. When the feed motor 2M is driven under the control of the controller 7, the transmission mechanism transmits power of the feed motor 2M to the feed roller 2*a*. That is, when the feed motor 2M is driven to rotate in a forward direction, the feed roller 2*a* is rotated to feed the sheet P in a conveyance direction E. At this time, the transmission mechanism presses the arm 2*b* so that the feed roller 2*a* comes close to the bottom surface 11*a*1 of the tray main body 11. As a result, the sheet P is fed in the conveyance direction E. When the feed motor 2M is driven to rotate in a reverse direction, the transmission mechanism rotates the arm 2*b* so as to separate the feed roller 2*a* from the bottom surface 11*a*1. As a result, the feed roller 2*a* does not feed the sheet P toward the roll body R. The arm 2*b* is configured to be retractable upward when the tray main body 11 is attached or detached.

The conveyance device 3 includes three conveyance roller pairs 3*a* to 3*c* and a conveyance motor 3M (see FIG. 3). Each of the conveyance roller pairs 3*a* to 3*c* includes a drive roller that is rotated by the driving of the conveyance motor 3M and a driven roller that is rotated by the drive roller. The conveyance motor 3M is driven under the control of the controller 7, and the conveyance roller pairs 3*a* to 3*c* are rotated while holding the sheet P so as to convey the sheet P in the conveyance direction E. The feed device 2 and the conveyance device 3 configure a conveyance mechanism of the present disclosure. The conveyance direction E in the present illustrative embodiment is a direction in which the sheet P is conveyed and advanced by the feed device 2 and the conveyance device 3. As shown in FIG. 1, the conveyance direction E is a direction in which the sheet P advances upward from the feed roller 2*a* toward a tip end side of the tray main body 11 and then advances horizontally toward the head 5.

The cutting device 4 is disposed above the conveyance roller pair 3*a*. The cutting device 4 includes a cutter 4*a* and a cutting motor 4M (see FIG. 3) that drives the cutter 4*a*. The sheet P unrolled from the roll body R is cut by the cutter 4*a* when the cutting motor 4M is driven under the control of the controller 7. As a result, a trailing end of the sheet P is formed.

The head 5 includes a plurality of nozzles (not shown) formed on a lower surface and a driver IC 5*a* (see FIG. 3). When the driver IC 5*a* is driven under the control of the controller 7, ink is discharged from the nozzles, and an image is formed on the sheet P conveyed by the conveyance device 3. The head 5 corresponds to an "image forming device" of the present disclosure, and may be either a line type in which ink is discharged from the nozzles in a state in which a position of the head 5 is fixed, or a serial type in which the head 5 discharges ink from the nozzles while moving in the axial direction of the rotation shaft Rx. The sheet P on which an image is formed by the head 5 and that is cut by the cutter 4*a* is received by the discharge tray 6 in a state in which the discharge tray 6 is opened relative to the housing 100*a*.

As shown in FIG. 3, the controller 7 is connected to the feed motor 2M, the conveyance motor 3M, the driver IC 5*a*, and the cutting motor 4M via an internal bus 100*b*. The controller 7 includes a central processing unit (CPU) 7*a*, a read only memory (ROM) 7*b*, and a random access memory (RAM) 7*c*. The ROM 7*b* stores programs and data for the CPU 7*a* to perform various controls. The RAM 7*c* temporarily stores data used when the CPU 7*a* executes a program.

Next, an operation from when the roll body R is accommodated in the feed tray 1 up to when the feed tray 1 is installed to the housing 100*a* will be described with reference to FIG. 2.

When the roll body R is to be accommodated in the feed tray 1, first, the feed tray 2 is removed from the housing 100*a*. Next, the roll body R is placed on the two rollers 14 and 15 of the support portion 12 as shown in FIG. 2. When the roll body R is to be replaced, the old roll body R accommodated in the feed tray 1 is taken out and then the new roll body R is accommodated.

Next, a user rotates the roll body R in the rotation direction B with a hand or the like. When the roll body R is rotated, a leading end of the sheet P rolled around the roll body R is unrolled from the roll body R and passes through the inlet 20*a* after the leading end of the sheet P passes through the support position Ra1 and before the leading end of the sheet P reaches the support position Ra2. Thereafter, the two inclined surfaces 13*a*1 and 13*b*1 for forming the path 20 guide the leading end of the sheet P into the path 20 in the advancing direction A. Since the support position Ra1 and the support position Ra2 are arranged at different positions in the upper-lower direction, a distance for the leading end of the sheet P to reach the support position Ra2 along a circumferential direction of the roll body R after the leading end of the sheet P passes through the support position Ra1 can be increased even when a separation distance between the two rollers 14 and 15 in the horizontal direction C is not increased, as compared with a case where the two support positions are located at the same position in the upper-lower direction D. Therefore, it is easy to unroll the leading end of the sheet P from the roll body R from a position where the leading end of the sheet P passes through the support position Ra1 up to a position where the leading end of the sheet P reaches the support position Ra2, and it is easy to guide the leading end of the sheet P into the path 20. Then, when the leading end of the sheet P reaches the vicinity of the tip end of the tray main body 11, the rotation of the roll body R is stopped. As a result, when the feed tray 1 is installed to the housing 100*a*, the sheet P can be fed by the feed roller 2*a*.

Next, a user installs the feed tray 1 that accommodates the roll body R to the housing 100*a*, as shown in FIG. 1. In this manner, the installation of the feed tray 1 that accommodates the roll body R is completed.

As described above, according to the feed tray 1 of the printer 100 of the present illustrative embodiment, the two support positions Ra1 and Ra2 of the support portion 12 that supports the roll body R are shifted in the upper-lower direction D. Accordingly, it is possible to increase a distance along a circumferential direction of the roll body R from a position where a leading end of the sheet P passes through a lower end of the roll body R from the support position Ra1 up to a position where the leading end of the sheet P reaches the support position Ra2 while preventing an increase in a separation distance between the two support positions Ra1 and Ra2 in the horizontal direction C. Therefore, it is possible to prevent an increase in the size of the feed tray 1 in the horizontal direction C while facilitating unrolling of the sheet P from the roll body R between a position where the sheet P passes through the support position Ra1 and a position where the sheet P reaches the support position Ra2. When a separation distance between the two rollers 14 and 15 in the horizontal direction C is increased and the separation distance between the two support positions Ra1 and Ra2 in the horizontal direction C is increased, the path 20 is increased along the horizontal direction C by an amount corresponding to the increased separation distance between the rollers 14 and 15. When the length of the path 20 in the horizontal direction C is increased, an arrangement of various components configuring the feed tray is shifted along the horizontal direction C by an amount corresponding to the increase in the length of the path 20 in the horizontal direction C, and the feed tray is increased in size along the horizontal direction C. In the present illustrative embodiment, since an increase in the separation distance between the two support positions Ra1 and Ra2 in the horizontal direction C is prevented, it is possible to prevent an increase in the size of the feed tray 1 in the horizontal direction C.

One support position Ra1 is higher than the other support position Ra2. As a result, it is easy to unroll the sheet P from the roll body R at an upstream side in the advancing direction A from the lower end of the roll body R. Therefore, it is easy to guide the sheet P into the path 20.

The inclined surface 13*b*1 is disposed below the support position Ra2, and is inclined downward as the inclined surface 13*b*1 is separated from the roll body R along the advancing direction A. As a result, the leading end of the sheet P unrolled from the roll body R can be smoothly guided in the advancing direction A. Therefore, it is possible to prevent the occurrence of a jam of the sheet P unrolled from the roll body R in the vicinity of the inlet 20*a* of the path 20. Although the inclined surface 13*b*1 according to the present illustrative embodiment has the inclination angle θ1 at which a jam is less likely to occur as described above, it may be possible to reduce the length of the path 20 in the horizontal direction C and prevent an increase in the size of the feed tray 1 by making the inclination angle θ1 close to 90 degrees. However, in the case of making the inclination angle θ1 close to 90 degrees, a jam may be likely to occur in the vicinity of the inlet 20*a* of the path 20.

Since the support portion 12 includes the two rollers 14 and 15, it is possible to smoothly rotate the roll body R.

Figure 4:
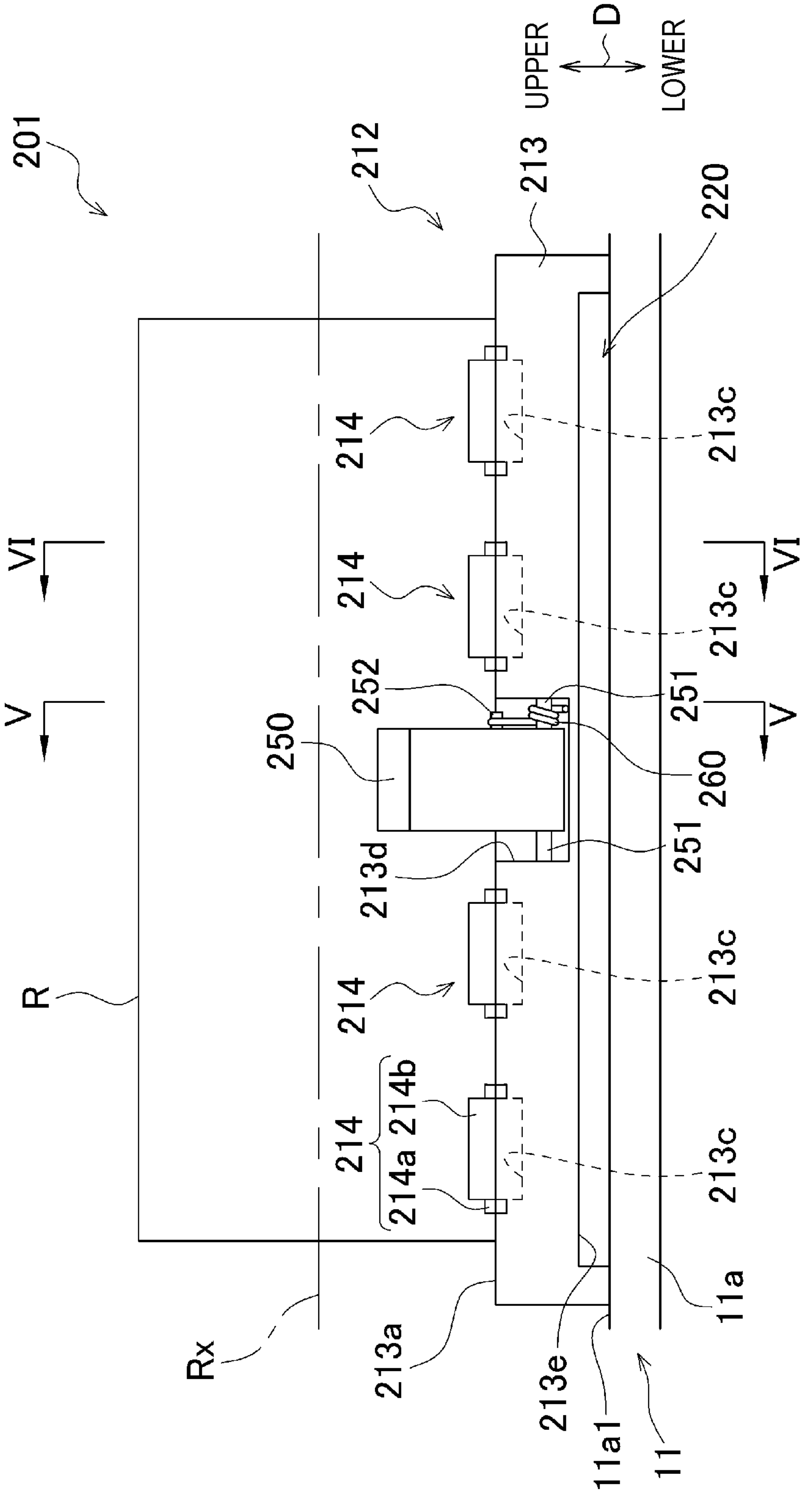
FIG. 4 is a cross sectional view showing a feed tray according to a modification as viewed from an installation direction when the feed tray is installed in a housing.

In the illustrative embodiment described above, in order to make it easy for the sheet P to be unrolled from the roll body R, the positions of the two support positions Ra1 and Ra2 in the upper-lower direction D are made different by shifting the arrangement positions of the two rollers 14 and 15 in the upper-lower direction D. However, the sheet P may be easily unrolled from the roll body R by bringing a flap 250 into contact with the outer peripheral surface of the roll body R. As shown in FIG. 4, a feed tray 201 according to a modification is similar to the feed tray 1 except that the feed tray 201 includes: a support portion 212 that is different from the support portion 12; the flap 250; and a coil spring 260. Components the same as those of the feed tray 1 described above are denoted by the same reference numerals, and description thereof will be omitted.

Figure 5:
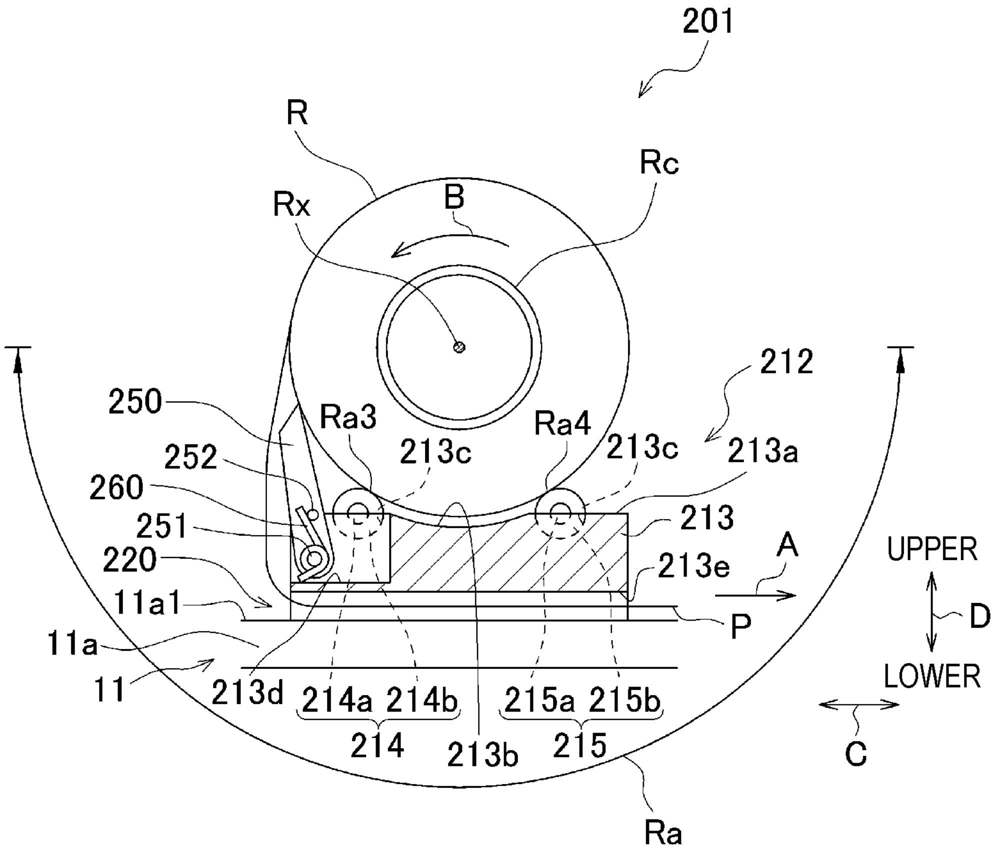
FIG. 5 is a cross sectional view taken along a line V-V shown in FIG. 4.
Figure 6:
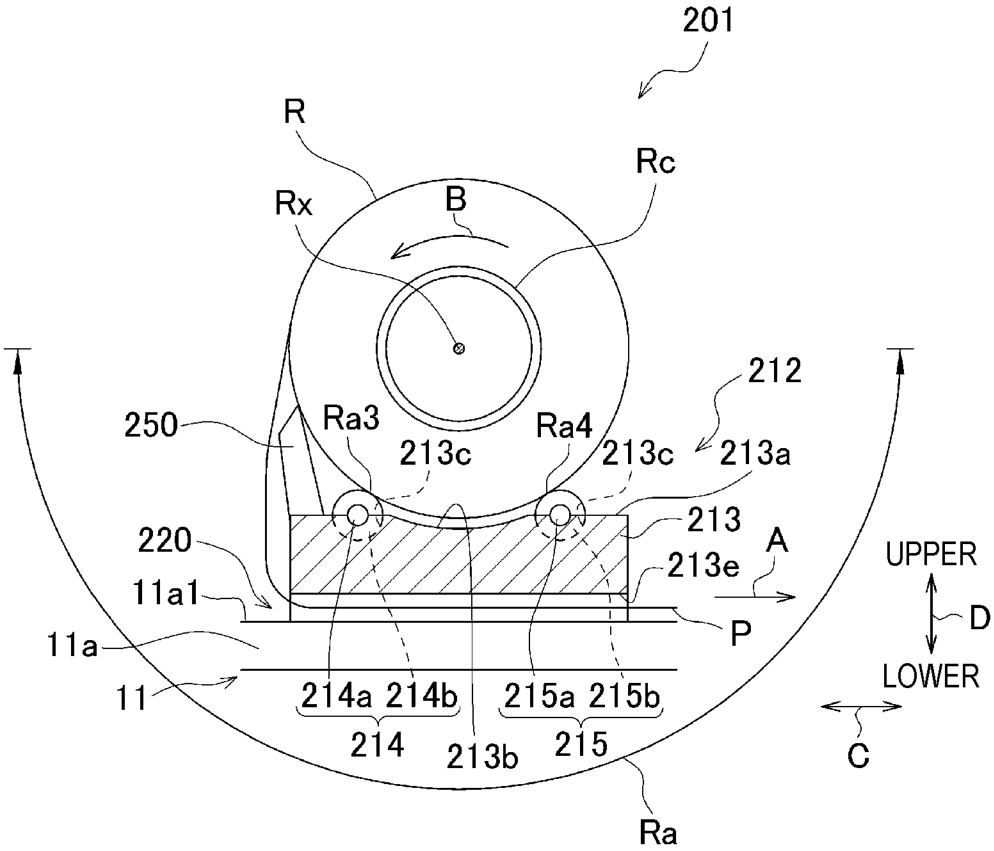
FIG. 6 is a cross sectional view taken along line a VI-VI shown in FIG. 4.
Figure 7:
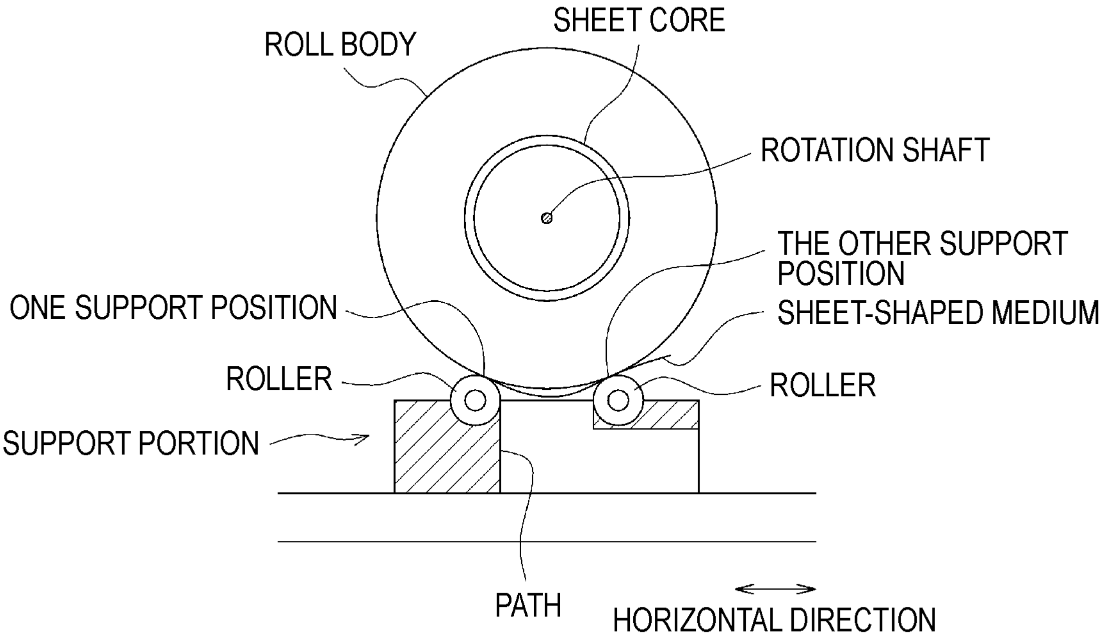
FIG. 7 is a cross sectional view showing main parts of a feed tray including a support base that supports a roll body from below at the same height position.

As shown in FIGS. 4 to 6, the support portion 212 includes a support base 213 and eight rollers 214 and 215. The support base 213 has a substantially rectangular parallelepiped shape that is slightly longer than the roll body R in the axial direction of the rotation shaft Rx. A curved surface 213*b* curved along an outer shape of the roll body R is formed at the center of an upper surface 213*a* of the support base 213 in the horizontal direction C. The curved surface 213*b* is formed over the entire length of the support base 213 along the axial direction of the rotation shaft Rx. The support base 213 is formed with eight recessed portions 213*c* opened upward and a recessed portion 213*d* that is opened upward and is opened to a side (in the horizontal direction C and in a direction opposite to the advancing direction A). Every four of the eight recessed portions 213*c* are arranged in the horizontal direction C with the curved surface 213*b* interposed between four recessed portions 213*c* at one side and four recessed portions 213*c* at the other side. The four recessed portions 213*c* arranged upstream of the support base 213 in the advancing direction A and the four recessed portions 213*c* arranged downstream of the support base 213 in the advancing direction A are arranged side by side along the axial direction of the rotation shaft Rx. As shown in FIG. 4, the recessed portion 213*d* is disposed at the center of the support base 213 in the axial direction of the rotation shaft Rx.

As shown in FIGS. 4 to 6, a groove 213*e* that defines a part of the path 220 is formed in a lower surface of the support base 213. The groove 213*e* is opened toward the bottom surface 11*a*1, extends horizontally along the advancing direction A, and is formed such that a width of the groove 213*e* in the axial direction of the rotation shaft Rx is slightly longer than the width of the roll body R. The groove 213*e* is formed over the entire length of the lower surface of the support base 213 in the advancing direction A. The path 220 is defined by the bottom surface 11*a* of the tray main body 11 and the groove 213*e*.

As shown in FIGS. 4 to 6, the eight rollers 214 and 215 are disposed above the support base 213. The eight rollers 214 and 215 are disposed in the eight recessed portions 213*c*, and upper half portions of the rollers 214 and 215 are exposed. That is, four rollers 214 and four rollers 215 are arranged in the horizontal direction C with the curved surface 213*b* interposed between the four rollers 214 and the four rollers 215. The four rollers 214 and the four rollers 215 are arranged side by side along the axial direction of the rotation shaft Rx. Similar to the rollers 14 and 15 described above, the rollers 214 and 215 respectively include shaft members 214*a* and 215*a* and cylindrical members 214*b* and 215*b*, into which the shaft members 214*a* and 215*a* are inserted respectively. The shaft members 214*a* of the four rollers 214 are supported by the support base 213 so as to be rotatable about a rotation shaft parallel to the rotation shaft Rx. The shaft members 15*a* of the four rollers 215 are supported by the support base 213 so as to be rotatable about a rotation shaft parallel to the rotation shaft Rx. The rollers 214 are disposed upstream of the rollers 215 in the advancing direction A.

The rollers 214 and 215 support the roll body R from below in a state in which the rollers 214 and 215 come into contact with an outer peripheral surface of a lower portion of the roll body R, that is, a lower semicircular region Ra of the outer peripheral surface of the roll body R as shown in FIGS. 5 and 6. The rollers 214 and 215 can support the roll body R in a state in which the rollers 214 and 215 come into contact with the outer peripheral surface of the roll body R at support positions Ra3 and Ra4 with the lower end of the roll body R being interposed therebetween in the horizontal direction C. In other words, the support positions Ra3 and Ra4 are opposite to each other across the lower end of the roll body R in the horizontal direction C. The support position Ra3 is located upstream of the lower end of the roll body R in the advancing direction A. The support position Ra4 is located downstream of the lower end of the roll body R in the advancing direction A. The support positions Ra3 and Ra4 are disposed at the same height position in the upper-lower direction D. A separation distance between the respective rollers 214 and 215 is smaller than an outer diameter of the core member Rc.

As shown in FIGS. 4 to 6, the flap (a "contact member" of the present disclosure) 250 is disposed in the recessed portion 213*d*. That is, the flap 250 is disposed at the center of the support base 213 in the axial direction of the rotation shaft Rx. The flap 250 is a plate-shaped member having a tip end of a tapered shape, and the flap 250 is disposed such that the tip end can come into contact with the outer peripheral surface of the roll body R. More specifically, the flap 250 is disposed such that the tip end of the flap 250 can come into contact with the outer peripheral surface of the roll body R at an upstream side of a lower end of the roll body R and at an outer side of the support positions Ra3 and Ra4 in the advancing direction A. A pair of shaft portions 251 protruding in the axial direction of the rotation shaft Rx are formed at a base end portion of the flap 250. The flap 250 is supported by the support base 213 via the pair of shaft portions 251 so as to be rotatable about a rotation shaft parallel to the rotation shaft Rx. As shown in FIG. 5, the flap 250 is disposed such that a rotation center of the flap 250 is located upstream of the lower end of the roll body R in the advancing direction A and is located below the support position Ra3. In addition, a protrusion 252 protruding in the axial direction of the rotation shaft Rx is formed at a central portion of a side surface of the flap 250.

The coil spring (a "pressing member" of the present disclosure) 260 is disposed in a manner of passing through one shaft portion 251 of the pair of shaft portions 251. The coil spring 260 is disposed such that one end portion of the coil spring 260 comes into contact with a bottom portion of the recessed portion 213*d* of the support base 213 and the other end portion of the coil spring 260 comes into contact with the protrusion 252 of the flap 250, and the coil spring 260 presses the flap 250 such that the tip end of the flap 250 is pressed against the outer peripheral surface of the roll body R.

Next, an operation from when the roll body R is accommodated in the feed tray 201 to when the feed tray 201 is installed to the housing 100*a* will be described with reference to FIG. 5.

When the roll body R is to be accommodated in the feed tray 201, first, the feed tray 201 is removed from the housing 100*a*. Next, the roll body R is placed on the eight rollers 214 and 215 of the support portion 212 as shown in FIG. 5. When the roll body R is to be replaced, the old roll body R accommodated in the feed tray 201 is taken out and then the new roll body R is accommodated. Thereafter, the tip end of the flap 250 is brought into contact with the outer peripheral surface of the roll body R.

Next, a user rotates the roll body R in the rotation direction B with a hand or the like. When the roll body R is rotated, the tip end of the flap 250 enters between the roll body R and the leading end of the sheet P, and the leading end of the sheet P is unrolled from the roll body R. The leading end of the sheet P unrolled from the roll body R advances downward outside the flap 250, enters the path 220 from an inlet of the path 220 at an upstream side in the advancing direction A, and advances along the advancing direction A. Then, when the leading end of the sheet P reaches the vicinity of the tip end of the tray main body 11, the rotation of the roll body R is stopped. As a result, when the feed tray 201 is installed to the housing 100*a*, the sheet P can be fed by the feed roller 2*a*.

Next, a user installs the feed tray 201 that accommodates the roll body R to the housing 100*a*. In this manner, the installation of the feed tray 201 that accommodates the roll body R is completed.

As described above, according to the feed tray 201 of the present modification, it is easy to unroll the sheet P from the roll body R by bringing the flap 250 into contact with the outer peripheral surface of the roll R.

The support portion 212 comes into contact with the outer peripheral surface of a lower portion of the roll body R at the two support positions Ra3 and Ra4 to rotatably support the roll body R. As a result, it is easy to replace the roll body R.

The flap 250 comes into contact with the roll body R outside the two support positions Ra3 and Ra4. As a result, it is possible to prevent an increase in the separation distance between the two support positions Ra3 and Ra4 in the horizontal direction C, as compared with a case where the flap 250 comes into contact with a lower portion of the roll body R between the two support positions Ra3 and Ra4.

The path 220 extends horizontally in a manner of passing below the two support positions Ra3 and Ra4. As a result, the sheet P unrolled from the roll body R by the flap 250 can be smoothly guided to pass below the two support positions Ra3 and Ra4.

Since the coil spring 260 is provided, the outer peripheral surface of the roll body R can be reliably pressed by the flap 250. Therefore, it is possible to make it easy to unroll the sheet P from the roll body R.

Although the flap 250 comes into contact with the central portion of the outer peripheral surface of the roll body R in the axial direction of the rotation shaft Rx in the modification described above, the flap 250 may come into contact with at least a part of another portion other than the central portion, or may come into contact with the central portion and at least a part of the another portion.

The flap 250 may be disposed in a manner of coming into contact with the outer peripheral surface of a lower half portion of the roll body R between the two support positions Ra3 and Ra4. In this case, the path 220 is preferably formed in the same manner as the path 20 in the illustrative embodiment described above.

In the modification described above, the coil spring 260 presses the flap 250 such that the tip end of the flap 250 comes into contact with the outer peripheral surface of the roll body R. Alternatively, the flap 250 may be pressed by a pressing member other than the coil spring 260. The rotation center of the flap 250 may be disposed in a manner of being separated further from the rotation shaft Rx than the tip end of the flap 250 in the horizontal direction C and may be disposed lower than the tip end, and the tip end of the flap 250 may come into contact with the outer peripheral surface of the roll body R due to the weight of the flap 250. In this manner, it is not necessary to provide a pressing member, and the structure can be simplified. In addition, the flap 250 may be bent, and a tip end of a corner of a bent portion may be brought into contact with the outer peripheral surface of the roll body R. That is, an intermediate portion of the flap 250 other than the tip end in the longitudinal direction may be brought into contact with the outer peripheral surface of the roll body R.

The roll body R is supported from below by a plurality of rollers 214 and 215 in the modification described above. Alternatively, the support portion 212 may rotatably support both ends of the core member Rc so as to support the roll body R.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, although the support position Ra1 is located at a position higher than the support position Ra2 in the illustrative embodiment described above, the support position Ra2 may be located at a position higher than the support position Ra1. In this case as well, it is possible to increase a distance along a circumferential direction of the roll body R from a position where a leading end of the sheet P passes through a lower end of the roll body R from the support position Ra1 up to a position where the leading end of the sheet P reaches the support position Ra2 while preventing an increase in a separation distance between the two support positions Ra1 and Ra2 in the horizontal direction C. Therefore, the same effects as those of the illustrative embodiment described above can be obtained.

Although the roll body R is supported from below by the rollers 14, 15, 214, and 215 in the illustrative embodiment and the modification described above, the roll body R may be supported from below by a member other than the rollers (for example, a support surface such as a curved surface) instead of the rollers 14, 15, 214, and 215.

A vertical surface along the upper-lower direction D may be provided instead of the inclined surfaces 13*a*1 and 13*b*1 described above. When the roll body R is supported by bringing a member into contact with the outer peripheral surface of a lower portion of the roll body R, the roll body R may have no core and does not include the core member Rc. The present invention can be applied to any feed tray accommodating the roll body R. Further, the present invention can be applied to a feed tray configured to accommodate not only the roll body R but also a cut sheet.

What is claimed is:

1. A feed tray for use with an image forming apparatus, the feed tray configured to accommodate a roll, in which a sheet-shaped medium is rolled in a roll shape, the feed tray comprising:

a support portion, comprising two support rollers each configured to contact an outer peripheral surface of a lower portion of the roll at a different one of two support positions with a lower end of the roll being interposed therebetween and to rotatably support the roll;

a member, contactable with the roll, and arranged at a location downstream with respect to the two support rollers in a direction in which the sheet-shaped medium unrolled from the roll is fed, the member configured to limit a loosening of the roll; and a path having an inlet disposed between the two support positions and configured to guide the sheet-shaped medium unrolled from the roll, wherein the two support positions are shifted from each other in an upper-lower direction.

2. The feed tray according to claim 1, wherein the two support positions include a first support position and a second support position, the first support position being located upstream of the lower end of the roll in a first direction and at a position higher than the second support position, the sheet-shaped medium unrolled from the roll being advanced in the first direction and guided into the path.

3. The feed tray according to claim 2, wherein the path has a first guide surface and a second guide surface, the first guide surface facing an upper surface of the sheet-shaped medium unrolled from the roll, and the second guide surface facing a lower surface of the sheet-shaped medium, and wherein the first guide surface is disposed below the second support position and is inclined downward as the first guide surface is separated from the roll along the first direction.

4. The feed tray according to claim 3, wherein the second guide surface is inclined downward as the second guide surface is separated from the roll along the first direction, and wherein an inclination angle of the first guide surface relative to a horizontal plane is larger than an inclination angle of the second guide surface relative to the horizontal plane.

5. The feed tray according to claim 1, wherein the two support rollers being rotatable about respective rotation shafts parallel to a rotation shaft of the roll.

6. The image forming apparatus according to claim 1, wherein the member is located at a position higher than one of the two support positions, the position being located on a downstream side in the direction in which the sheet-shaped medium is fed.

7. The image forming apparatus according to claim 6, wherein another member that is contactable with the roll is arranged at a location upstream with respect to the two support rollers in the direction which the sheet-shaped medium is fed.

8. The image forming apparatus according to claim 6, wherein the member extends upward from the support portion.

9. The image forming apparatus according to claim 1, wherein the member is located at a position higher than one of the two support positions, the position being located on an upstream side in the direction in which the sheet-shaped medium is fed.

10. The image forming apparatus according to claim 1, wherein a portion of the path is located under the member.

11. A feed tray for use with an image forming apparatus, the feed tray configured to accommodate a roll, in which a sheet-shaped medium is rolled into a roll shape, the feed tray comprising:

a support portion configured to rotatably support the roll and comprising a support base; and a contact member configured to contact at least a part of an outer peripheral surface of a lower portion of the roll and to restrict a movement of the roll in a rotation direction, wherein the contact member is disposed in a recessed portion at a center of the support portion in an axial direction of a rotation of the roll.

12. The feed tray according to claim 11, wherein the support portion is configured to contact the outer peripheral surface of the lower portion of the roll at two support positions with a lower end of the roll being interposed therebetween and to rotatably support the roll.

13. The feed tray according to claim 12, wherein the contact member is configured to contact the roll outside the two support positions.

14. The feed tray according to claim 13, further comprising:

a path configured to guide the sheet-shaped medium unrolled from the roll, wherein the path extends in a first direction so as to pass below the two support positions, the two support positions being opposite to each other across the lower end of the roll in the first direction.

15. The feed tray according to claim 12, wherein the support portion includes two support rollers, each configured to contact the outer peripheral surface of the lower portion of the roll at a different one of two support positions, the two support rollers being rotatable about respective rotation shafts parallel to a rotation shaft of the roll.

16. The feed tray according to claim 14, wherein the path extends horizontally so as to pass below the two support positions.

17. The feed tray according to claim 11, further comprising:

a pressing member configured to press the contact member against the outer peripheral surface of the roll.

18. An image forming apparatus comprising:

a feed tray configured to accommodate a roll, in which a sheet-shaped medium is rolled in a roll shape, the feed tray comprising:

a support portion, comprising two support rollers each configured to contact an outer peripheral surface of a lower portion of the roll at a different one of two support positions with a lower end of the roll being interposed therebetween and to rotatably support the roll;

a member, contactable with the roll, and arranged at a location downstream with respect to the two support rollers in a direction in which the sheet-shaped medium unrolled from the roll is fed, the member configured to limit a loosening of the roll; and a path having an inlet disposed between the two support positions and configured to guide the sheet-shaped medium unrolled from the roll, wherein the two support positions are shifted from each other in an upper-lower direction, a conveyance mechanism configured to convey the sheet-shaped medium of the roll accommodated in the feed tray;

an image forming device configured to form an image on the sheet-shaped medium conveyed by the conveyance mechanism; and a housing configured to accommodate the conveyance mechanism and the image forming device, the feed tray being attachable to and removable from the housing.

19. The image forming apparatus according to claim 18, wherein the two support positions include a first support position and a second support position, the first support position being located upstream of the lower end of the roll in a first direction and at a position higher than the second support position, the sheet-shaped medium unrolled from the roll being advanced in the first direction and guided into the path.

20. The image forming apparatus according to claim 19, wherein feed tray is attachable to the housing in the first direction.

21. The image forming apparatus according to claim 18, wherein the two support rollers being rotatable about respective rotation shafts parallel to a rotation shaft of the roll.

22. An image forming apparatus comprising:

a feed tray configured to accommodate a roll, in which a sheet-shaped medium is rolled into a roll shape, the feed tray comprising:

a support portion configured to rotatably support the roll and comprising a support base; and a contact member configured to contact at least a part of an outer peripheral surface of a lower portion of the roll and to restrict a movement of the roll in a rotation direction, wherein the contact member is disposed in a recessed portion at a center of the support portion in an axial direction of a rotation of the roll, a conveyance mechanism configured to convey the sheet-shaped medium of the roll accommodated in the feed tray;

an image forming device configured to form an image on the sheet-shaped medium conveyed by the conveyance mechanism; and a housing configured to accommodate the conveyance mechanism and the image forming device, the feed tray being attachable to and removable from the housing.

23. The image forming apparatus according to claim 22, wherein the support portion is configured to contact the outer peripheral surface of the lower portion of the roll at two support positions across a lower end of the roll and to rotatably support the roll.

24. The image forming apparatus according to claim 23, wherein feed tray is attachable to the housing in a first direction, wherein the feed tray further comprises a path configured to guide the sheet-shaped medium unrolled from the roll, and wherein the path extends in the first direction so as to pass below the two support positions.

25. The image forming apparatus according to claim 22, further comprising:

a pressing member configured to press the contact member against the outer peripheral surface of the roll.

* * * * *